United States Patent [19]

Wong et al.

[11] 4,000,869
[45] Jan. 4, 1977

[54] STRONG SHOCK BOUNDARY LAYER INTERACTION CONTROL SYSTEM

[75] Inventors: Wilford F. Wong, Lakewood; Gordon R. Hall, Manhattan Beach; Tatsuo W. Tsukahira, Los Angeles; Robert D. Sutton, Cypress, all of Calif.

[73] Assignee: Northrop Corporation, Los Angeles, Calif.

[22] Filed: Oct. 21, 1975

[21] Appl. No.: 624,374

[52] U.S. Cl. .............................. 244/53 B; 137/15.1
[51] Int. Cl.² ....................................... B64D 33/02
[58] Field of Search ........... 244/42 CE, 53 B, 53 R; 137/15.1, 15.2

[56] References Cited

UNITED STATES PATENTS

| 2,589,945 | 3/1952 | Leduc | 137/15.1 |
| 2,971,331 | 2/1961 | Silverman et al. | 137/15.1 |
| 3,030,770 | 4/1962 | Ranard et al. | 137/15.1 |
| 3,062,484 | 11/1962 | Himka | 244/53 B |
| 3,077,735 | 2/1963 | Johnson et al. | 137/15.1 |
| 3,417,767 | 12/1968 | Young | 137/15.2 |
| 3,439,692 | 4/1969 | Pike | 137/15.2 |

Primary Examiner—Trygve M. Blix
Assistant Examiner—Galen Barefoot
Attorney, Agent, or Firm—Willard M. Graham; William W. Rundle

[57] ABSTRACT

A control system for suppression of shock-induced flow separation caused by the interaction of turbulent boundary layer air and a strong normal shock in the air inlet of a supersonic aircraft by application of continuous bleeding upstream and across the shock boundary layer interaction region of the inlet through a porous cover which leads to a row of plenums from whence the bleed air is exhausted to atmosphere, through a controlled incrementally operated door. The control system can control interactions with normal shock strength approaching Mach=2 in strength.

3 Claims, 2 Drawing Figures

STRONG SHOCK BOUNDARY LAYER INTERACTION CONTROL SYSTEM

BACKGROUND OF THE INVENTION

The invention herein described was made in the course of United States Air Force Contract F33657-72-C-0706.

In recent years, supersonic aircraft capable of high maneuverability in transonic flight generally have employed simple fixed geometry external compression inlets incorporating a low compression surface. However, operation of such an inlet at supersonic Mach Numbers, M=2 for example, can result in severe flow distortion and high recovery losses at the engine inlet due to the strong shock boundary layer interaction and separation, thereby substantially reducing engine performance.

A simple inlet bleed system for controlling shock boundary layer interactions in supersonic air inlets is disclosed in U.S. Pat. No. 3,062,484, "Supersonic Air Inlet Construction", issued Nov. 6, 1962 to T. Himka. However, that system is designed for controlling relatively weak interactions occurring in the throat region of a "mixed compression" type of inlet. For the started condition, the normal shock occurring that type of inlet rarely exceeds Mach 1.3 – 1.4 in strength in order to maximize the recovery, thus obtaining maximum recovery occurring for normal shock approaching Mach 1 in strength.

Although Himka refers to the interactions as "strong shock wave interactions", they are relatively weak compared to the shock strengths contemplated by the present invention. In fact, the throat bleed configuration disclosed in Himka's patent does not suppress strong-shock interaction with normal shock strength in the Mach 1.6 – 2.0 range for the following reasons: firstly, Himka's design implies bleeding only upstream of the interaction. For strong shock interaction, it is necessary to bleed upstream and across the interaction. Secondly, assuming the strong shock interaction occurs over the bleed surface, recirculation effects will result from Himka's design due to the common plenum which would allow high pressure bleed air downstream of the shock to flow back through the low pressure bleed region upstream of the shock, thus preventing the required upstream bleed from developing. For the strong shock considered in the current configuration, the downstream pressure can be as much as four times the upstream pressure whereas for Himka's design, the shock strengths considered yield pressure ratios of 1.5 – 2.0. Hence, it can be seen that the recirculation effect is greatly amplified with shock strength when a common plenum is considered.

One solution to the recirculation effect is to have a sufficiently large common plenum to allow the high pressure bleed air downstream of the shock to diffuse to a pressure less than the pressure on the bleed surface upstream of the shock, thereby allowing the required upstream bleed to develop. However, for the shock strengths considered (M approaching 2), the required volume as well as exit area to maintain the low pressure and handle the required flow become impractical.

BRIEF SUMMARY OF THE INVENTION

It is a primary object of the present invention to overcome the disadvantages of piror bleed systems, of which the Himka patent is an example, by providing a bleed system for continuously removing the boundary layer air clinging to the inlet compression surface upstream and across the shock interaction region through a porous or perforated plate covering separate compartments or plenums; the bleed air being directed to atmosphere from the chambers through a hinged door remotely located from the plenums, and actuated to open in appropriate increments according to the bleed flow requirements on the compression ramp.

The present invention will be more clearly understood by reference to the ensuing detailed description and appended drawings.

DETAILED DESCRIPTION

Figure 1:
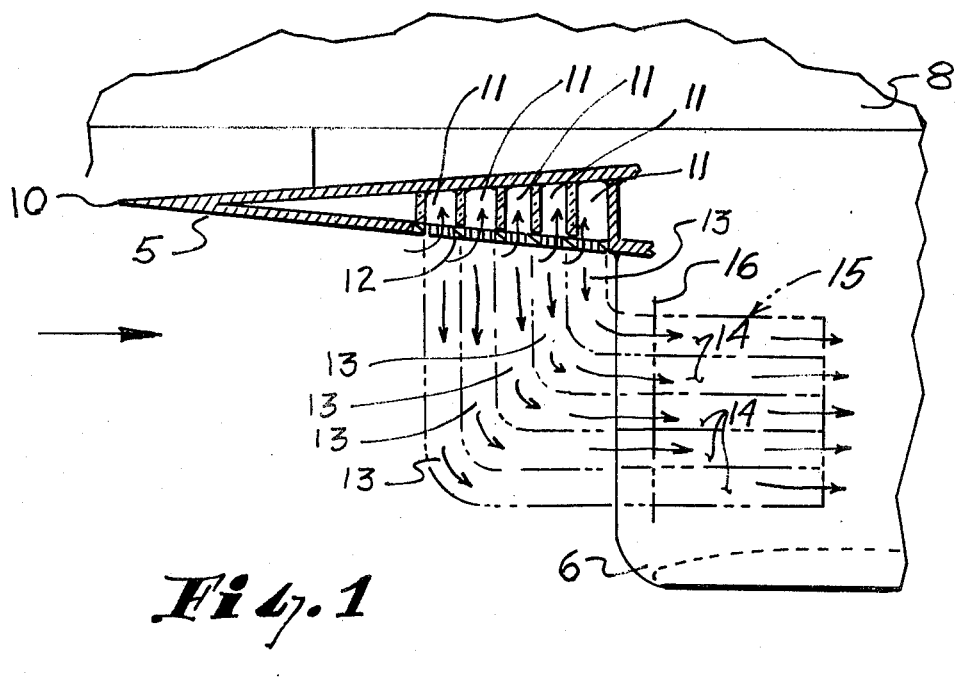
FIG. 1 is a fragmentary plan view showing a preferred construction of the present invention.
Figure 2:
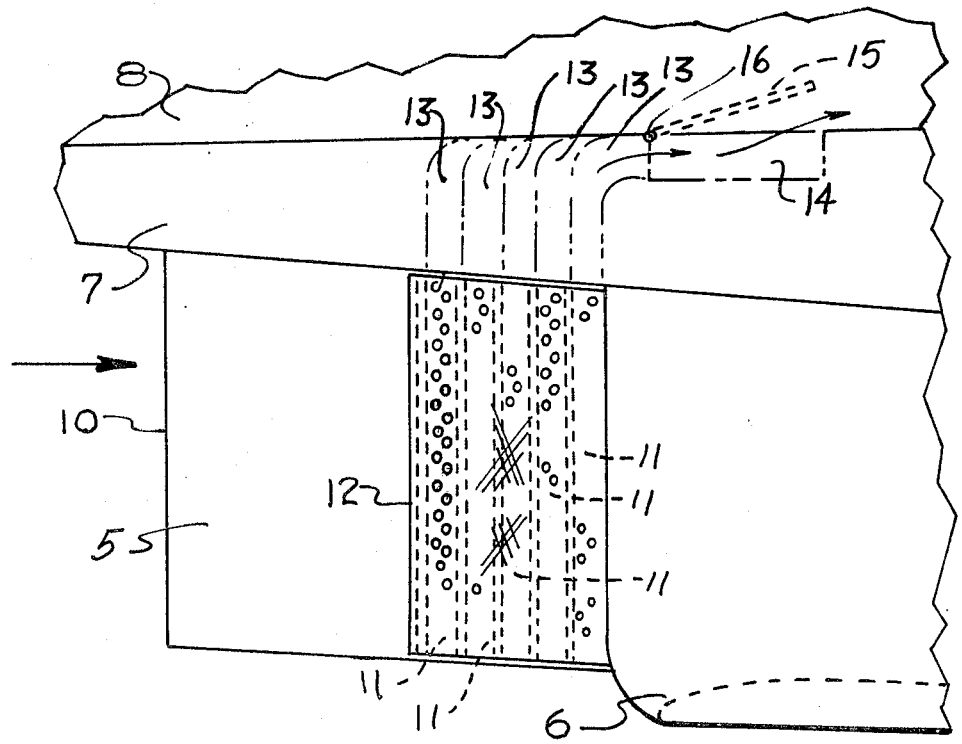
FIG. 2 is a fragmentary side elevational view showing the construction of the present invention as illustrated in FIG. 1.

As shown in the plan view of FIG. 1, and in the side elevational view of FIG. 2, a compression ramp 5 extends forwardly of the opening of the air inlet 6 mounted below the wing 7 of a supersonic aircraft, on the fuselage 8, only a fragment of which is represented. The ramp 5, inlet 6, and aircraft are of generally conventional design.

The ramp 5 is separated from the fuselage by a flow diverter 9 mounted on its inward side to the aircraft fuselage 8. In cross-section the ramp 5 is wedge-shaped, forming an angle, from the leading edge 10 thereof rearwardly, of approximately 7°, and is of hollow construction. The interior of the ramp 5, forwardly of the inlet opening, is provided with a row of vertically disposed plenums 11. The plenums are covered with a fixed, flat porous or perforated plate or panel 12 through which boundary layer air impinging on the inlet side of the ramp 5 is drawn into the plenums 11. At the upper ends of the plenums 11, ducts 13 are provided leading to a compartmented chamber 14 located near a region of relatively low pressure on the upper surface of the wing 7, which chamber 14 is enclosed by a door 15 hinged at its forward edge 16. The partitions or walls of the plenums 11 and compartmented chamber 14 as well as the ducts 13 preferably are formed of fiber-glass or other high strength, lightweight material. The door 15, which acts essentially as a valve, is controlled by conventional actuator (not shown) to open in predetermined increments so as to satisfy the varying bleed requirement on the compression ramp which is primarily a function of shock strength or flight Mach number. Typically, the opening schedule on the door 15 is such as to provide the minimum required bleed flow in order to minimize drag associated with excessive door opening and high bleed flow.

The location and extent of the region covered by the plenums 11 and perforated panel 12 on compression ramp 5 will be governed by variation of the terminal or normal shock position in this region as a function of engine power setting, Mach number, and aircraft attitude. For purposes of the present example, however, the bleed region is located with the aft boundary thereof coterminus with the inlet 6 and extends forwardly of the inlet to a point approximately midway between the inlet and the leading edge 10 of the ramp 5. The bleed region is divided into five plenums 11. The width of the plenums 11 are dimensioned to equal approximately five boundary layer thicknesses; the boundary layer thickness being defined as the undisturbed viscous layer of air clinging to the compression ramp 5 upstream of the normal shock (not shown). Each bleed plenum 11, is as shown, separately ducted to the wing compartment 14 and exhausted separately as the variable position door 15 is opened by an appropriate amount.

Thus it will be seen that the bleed region is located in the region where the interaction of turbulent boundary layer air and strong shock occurs.

The porosity of the perforated panels 12 preferably is established at approximately 23% with the normal holes sized relative to the local undisturbed boundary layer displacement thickness. The displacement thickness being defined at a similar location as the boundary layer thickness defined previously for the purpose of sizing the plenum width.

It will be readily understood by those skilled in the art that as the flight speed of the aircraft accelerates into the supersonic regime where strong shock boundary layer interactions occur on the inlet compression surface, the bleed system, located as described, effectively suppresses the shock-induced separation by removing the boundary layer upstream and across the interaction region, thereby substantially reducing flow distortion and ensuring low recovery losses at the engine inlet.

It will be understood that the location and width of the bleed area, and percentage of porosity of the panel, will depend on design paramenters peculiar to an inlet of given design, any modifications or equivalent systems being deemed to fall within the scope of the ensuing claims.

We claim:

1. In combination with a supersonic aircraft engine inlet provided with a compression ramp extending forwardly of the opening of said inlet, means suppressing strong shock-induced flow separation occurring from the interaction of turbulent boundary layer air on said ramp and normal shock increasing to Mach 2 strength, comprising:
   a. means defining a row of vertically disposed plenums in the interior of said ramp, said plenums extending across the region relative to the leading edge of said ramp and the opening of said inlet where said flow interaction occurs,
   b. a fixed, flat porous plate covering said plenums to bleed said turbulent boundary layer air into said plenums,
   c. separate duct means leading from each of said plenums to a region of low pressure adjacent to the exterior of said aircraft to exhaust air from said plenums, and
   d. variable position valve means for incrementally controlling the exhaust exit of said duct means.

2. The combination according to claim 1 wherein said vertical plenums are defined in the interior of said ramp by a row of vertically disposed, spaced partitions open at the upper ends thereof.

3. The combination according to claim 1 wherein said variable position means includes a compartmented chamber provided below a region of low pressure adjacent the surface of said aircraft, each compartment of said chamber being connected to a respective plenum, and wherein said variable position means is a hinged door covering said chamber, said door being incrementally controllable to open a sufficient amount to satisfy the demand of the bleed air exhausted therefrom.

* * * * *